(12) United States Patent
Jiang et al.

(10) Patent No.: US 12,713,491 B2
(45) Date of Patent: Aug. 18, 2026

(54) WORKING STATE SWITCHING METHOD AND APPARATUS, TERMINAL, AND READ STORAGE MEDIUM

(71) Applicant: VIVO MOBILE COMMUNICATION CO., LTD., Guangdong (CN)

(72) Inventors: Dajie Jiang, Guangdong (CN); Kun Yang, Guangdong (CN); Fei Qin, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 578 days.

(21) Appl. No.: 18/175,771

(22) Filed: Feb. 28, 2023

(65) Prior Publication Data

US 2023/0209642 A1 Jun. 29, 2023

Related U.S. Application Data

(63) Continuation of application No. PCT/CN2021/117117, filed on Sep. 8, 2021.

(30) Foreign Application Priority Data

Sep. 8, 2020 (CN) ......................... 202010937452.8

(51) Int. Cl.
*H04W 76/27* (2018.01)

(52) U.S. Cl.
CPC .................................. *H04W 76/27* (2018.02)

(58) Field of Classification Search
CPC ..... H04W 76/27; H04W 40/12; H04W 40/22; H04W 40/24; H04W 16/26; H04W 88/04;
(Continued)

(56) References Cited

U.S. PATENT DOCUMENTS

2010/0285743 A1 11/2010 Li et al.
2013/0122892 A1 5/2013 Morioka et al.
(Continued)

FOREIGN PATENT DOCUMENTS

CN 101237278 A 8/2008
CN 111181618 A 5/2020
(Continued)

OTHER PUBLICATIONS

IEEE: Practical Modeling and Beamforming for Intelligent Reflecting Surface Aided Wideband Systems; Wenhao Cai et al. Jul. 2020 (Year: 2020).*

(Continued)

*Primary Examiner* — Mohammed S Chowdhury
(74) *Attorney, Agent, or Firm* — Perilla Knox & Hildebrandt; Kenneth A. Knox

(57) ABSTRACT

This application discloses a working state switching method and apparatus, a terminal, and a readable storage medium. The method includes: when a trigger condition is met, switching, by a terminal, from a first working state to a second working state, where the first working state means that the terminal is in a first state on a first downlink, and the second working state means that the terminal is in a second state on a second downlink; and the first downlink or the second downlink includes at least one of the following: a downlink A, a downlink B, and a downlink C.

19 Claims, 4 Drawing Sheets

(58) Field of Classification Search
CPC ......... H04W 52/0216; H04W 52/0229; H04W 52/0251; H04W 52/028; H04W 76/15; H04W 52/0209; H04W 52/0248; H04B 7/04013; H04B 7/145; Y02D 30/70; G01S 5/0036; G01S 5/0273; G01S 1/08
See application file for complete search history.

(56) References Cited

U.S. PATENT DOCUMENTS

| | | | | |
|---|---|---|---|---|
| 2019/0320361 | A1 | 10/2019 | Uchiyama et al. | |
| 2019/0373440 | A1 | 12/2019 | Agiwal et al. | |
| 2020/0037218 | A1 | 1/2020 | Karampatsis et al. | |
| 2020/0281040 | A1 * | 9/2020 | Kim | H04W 76/25 |
| 2021/0410181 | A1 * | 12/2021 | Jeon | H04W 52/0258 |
| 2023/0199734 | A1 * | 6/2023 | Sun | H04L 5/0023<br>370/329 |
| 2023/0208479 | A1 * | 6/2023 | Wang | H04B 7/0617<br>375/262 |
| 2023/0258759 | A1 * | 8/2023 | Wang | G01S 1/0423<br>455/456.1 |

FOREIGN PATENT DOCUMENTS

| | | |
|---|---|---|
| CN | 111294095 A | 6/2020 |
| CN | 111314893 A | 6/2020 |
| JP | 2012010112 A | 1/2012 |
| JP | 20140827360 A | 5/2014 |
| JP | 2018026625 A | 2/2018 |

OTHER PUBLICATIONS

IEEE: Joint Active and Passive Beamforming Optimization for Intelligent Reflecting Surface Assisted Swipt Under QoS Constraints; Qingqing Wu , Member, IEEE and Rui Zhang , Fellow, IEEE. Aug. 2020 (Year: 2020).*

IEEE: Intelligent Reflecting Surface Enhanced Wireless Network via Joint Active and Passive Beamforming. Qingqing Wu , Member, IEEE, and Rui Zhang , Fellow, IEEE. Nov. 2019 (Year: 2019).*

IEEE: Augmenting Transmission Environments for Better Communications: Tunable Reflector Assisted MmWave WLANs; Lan Zhang , Li Yan , Bin Lin , Haichuan Ding , Yuguang Fang , Fellow, IEEE, and Xuming Fang , Senior Member, IEEE. Jul. 2020 (Year: 2020).*

Marco Di Renzo, et al., "Reconfigurable Intelligent Surfaces vs. Relaying: Differences, Similarities, and Performance Comparison", Communications Society, Jul. 1, 2020.

Ioannis Chatzigeorgiou, The Impact of 5G Channel Models on the Performance of Intelligent Reflecting Surfaces and Decode-and-Forward Relaying, Nov. 1, 2020, School of Computing and Communications, Lancaster University, Lancaster LA1 4WA, United Kingdom.

* cited by examiner

WORKING STATE SWITCHING METHOD AND APPARATUS, TERMINAL, AND READ STORAGE MEDIUM

CROSS-REFERENCE TO RELATED APPLICATIONS

This application is continuation application of PCT International Application No. PCT/CN2021/117117 filed on Sep. 8, 2021, which claims priority to Chinese Patent Application No. 202010937452.8, filed on Sep. 8, 2020 in China, which are incorporated herein by reference in their entireties.

TECHNICAL FIELD

This application pertains to the field of communications technologies, and specifically relates to a working state switching method and apparatus, a terminal, and a readable storage medium.

BACKGROUND

In a mobile communications system, a large intelligent surface (LIS) enhances a signal-to-noise ratio of a signal of a base station received by a terminal or expands coverage of a signal of a base station by changing features such as an amplitude and a phase of the signal of the base station. In this manner, efficiency of transmission from the base station to the terminal is relatively high, but the terminal is also more power-consuming correspondingly.

In the large system including the LIS and the base station, a plurality of downlink logical links and a plurality of uplink logical links are included. In the prior art, currently, a manner in which the terminal works on different downlink logical links and performs switching between different downlink logical links in the system including the LIS and the base station does not exist, resulting in a failure in balancing transmission efficiency and power saving of the terminal.

SUMMARY

According to a first aspect, a working state switching method is provided, including: when a trigger condition is met, switching, by a terminal, from a first working state to a second working state; and executing, by the terminal, a receiving behavior in the second working state, where the first working state means that the terminal is in a first state on a first downlink, and the second working state means that the terminal is in a second state on a second downlink; the first downlink or the second downlink includes at least one of the following: a downlink A, a downlink B, and a downlink C, where the downlink A is a link on which a network side device sends information to the terminal, the downlink B is a link on which a large intelligent surface LIS or a relay device sends information to the terminal by changing a signal feature of the downlink A, and the downlink C is a link on which the LIS or the relay device directly sends information to the terminal; and the trigger condition includes at least one of the following: target signaling is received; and a target timer in the first working state expires.

According to a second aspect, a working state switching apparatus is provided, applied to a terminal and including: a switching module, configured to: when a trigger condition is met, switch from a first working state to a second working state; and a receiving module, configured to execute a receiving behavior in the second working state, where the first working state means that the terminal is in a first state on a first downlink, and the second working state means that the terminal is in a second state on a second downlink; the first downlink or the second downlink includes at least one of the following: a downlink A, a downlink B, and a downlink C, where the downlink A is a link on which a network side device sends information to the terminal, the downlink B is a link on which a large intelligent surface LIS or a relay device sends information to the terminal by changing a signal feature of the downlink A, and the downlink C is a link on which the LIS or the relay device directly sends information to the terminal; and the trigger condition includes at least one of the following: target signaling is received; and a target timer in the first working state expires.

According to a third aspect, a terminal is provided. The terminal includes a processor, a memory, and a program or an instruction that is stored in the memory and that can be run on the processor, where when the program or the instruction is executed by the processor, the steps of the method in the first aspect are implemented.

According to a fourth aspect, a readable storage medium is provided. The readable storage medium stores a program or an instruction, and when the program or the instruction is executed by a processor, the steps of the method in the first aspect are implemented.

According to a fifth aspect, a chip is provided. The chip includes a processor and a communications interface, the communications interface is coupled to the processor, and the processor is configured to run a program or an instruction of a network side device to implement the method in the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "I" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a new radio (NR) system for example purposes, and NR terms are used in most of the following descriptions, but these technologies can also be applied to an application other than an NR system application, for example, a $6^{th}$ generation (6G) communications system.

Figure 1:
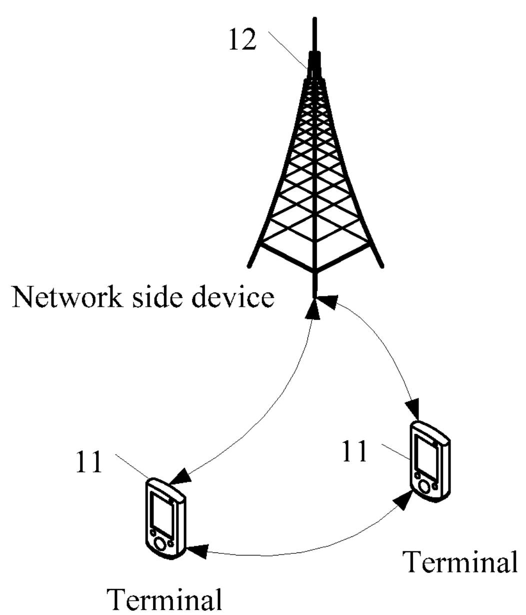
FIG. 1 is a block diagram of a wireless communications system to which embodiments of this application can be applied.

FIG. 1 is a block diagram of a wireless communications system to which embodiments of this application can be applied. The wireless communications system includes a terminal 11 and a network side device 12. The terminal 11 may also be referred to as a terminal device to user equipment (terminal). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a bracelet, a headset, and glasses. It should be noted that a specific type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

In addition, the related terms in this application are correspondingly explained.

1. Intelligent Surface/Metamaterial Surface

The intelligent surface is an emerging technology, and the following plurality of related terms represent a similar technology or entity. These terms include: a large intelligent surface (LIS), a smart reflect array (SRA), a reconfigurable reflect array (RRA), and an intelligent reflecting surface (IRS).

Figure 2:
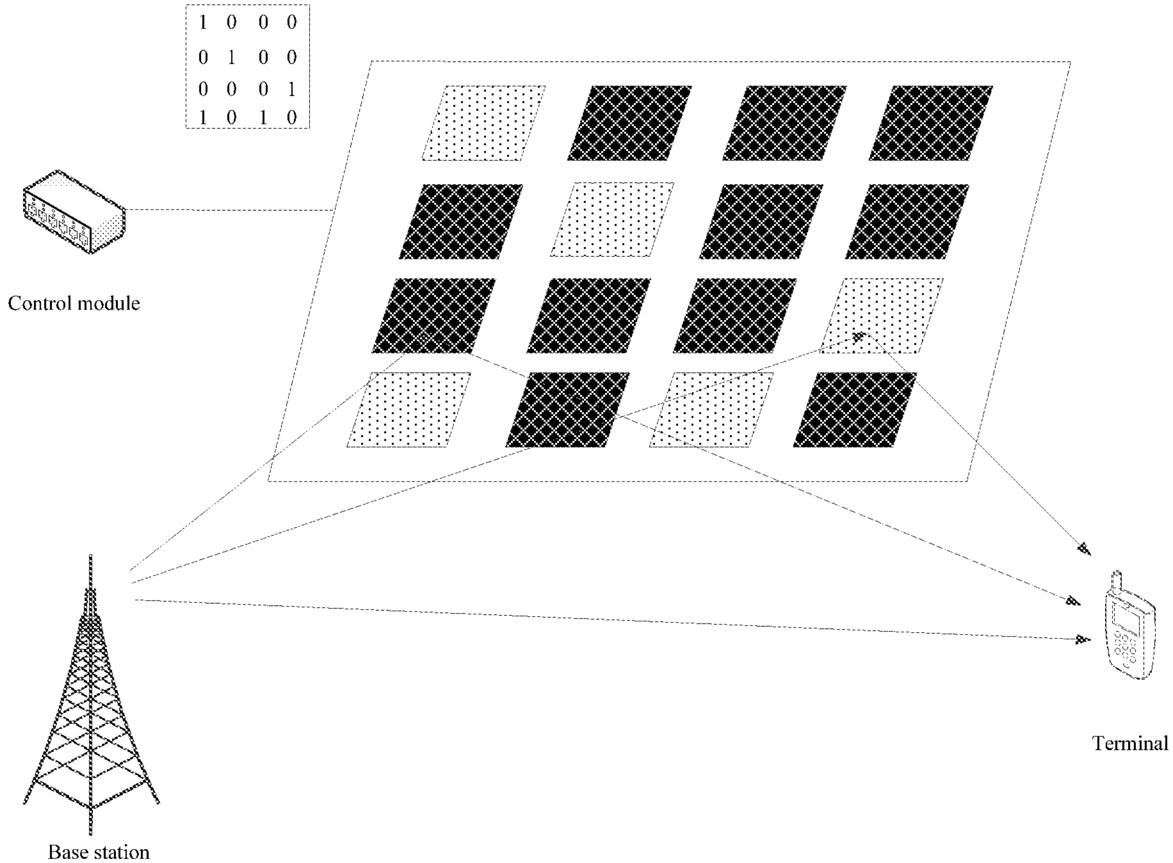
FIG. 2 is a schematic structural diagram of an intelligent surface device, a base station, and a terminal according to an embodiment of this application.

An intelligent surface device includes a massive component array and an array control module, as shown in FIG. 2. The massive component array is a large amount of component units that are regularly and repeatedly arranged on a planar baseboard. To achieve a considerable signal control effect, hundreds or thousands of component units are usually required to form the component array. Each component unit has a variable component structure. For example, the component unit includes a PIN diode, and a switch state of the PIN diode determines a response mode of the component unit to an external wireless signal. The array control module of the intelligent surface may control a working state of each component unit, to dynamically or semi-statically control a response mode of each component unit to a wireless signal. Wireless response signals of the component units of the massive component array are superposed to each other, forming a specified beam propagation feature in a macro sense. The control module is a "brain" of the intelligent surface device, and determines a wireless signal response beam of the intelligent surface according to a requirement of a communications system, so that an original static communication environment becomes "intelligent" and "controllable".

An intelligent surface technology is applied in a plurality of technical fields. There are many different design solutions according to different application scenarios. A tunable resonator variable capacitor type, a guided wave type, and an element rotation polarization type are included through classification according to physical principles [3] of the component units; a reflective intelligent surface and a transmissive intelligent surface are included through classification according to wireless signal output forms; a phase control intelligent surface, an amplitude control intelligent surface, and an amplitude and phase joint control intelligent surface are included through classification according to wireless signal response parameters [4]; a continuous control type and a discrete control type are included through classification according to response parameter control; and a static intelligent surface and a semi-static/dynamic control intelligent surface are included through classification according to frequencies or speeds of controlling amplitudes and phases of the intelligent surfaces, where the static intelligent surface can be applied to an existing system at present, such as a 4G/5G system. In view of complexity of design and fabrication of the components, discrete controlled component units using single radio signal response parameters are generally chosen in the academic community for research. Currently, an intelligent reflecting surface IRS (Intelligent Reflecting Surface) widely discussed in the academic community is a phase control intelligent surface based on signal reflection, and a phase of a reflection signal of a component unit is controlled by using 1-bit indication information, to implement phase inversion of 0 or $\pi$.

Since radio frequency and baseband processing circuits are not required, the intelligent surface device has several advantages over a conventional wireless communication transceiver device:

(1) The intelligent surface device has lower costs and implementation complexity.

(2) The intelligent surface device has lower power consumption.

(3) The intelligent surface does not introduce additional thermal noise at a receive end.

(4) The intelligent surface device is thin and lightweight, and can be deployed flexibly.

There are the following types of IRS reflection units:

A. Tunable resonator: A variable capacitor is integrated into the resonator to generate a phase shift by changing a frequency of a frequency-agile chip resonator.

B. Guided wave control method: In this case, an arrival space wave is coupled to a guided wave by an antenna, and then the guided wave performs a phase shift and then is retransmitted to form an antenna phase shifter.

C. Rotation technology of a circular polarization wave: This is designed by using a reflection rule of an electromagnetic wave.

Reflect arrays/intelligent surfaces can be classified into two types according to whether dynamic control can be performed:

(1) Static reflect array/intelligent surface: A structure and a function of the reflect array may be fixed. For an incident wave of one angle, a hypersurface unit causes a fixed change in characteristics such as an amplitude, a phase, and a polarization manner of the incident wave, to obtain a corresponding reflection wave.

(2) Dynamic reflect array/intelligent surface: A structure and a function of the reflect array may be controlled. For an incident wave of one angle, characteristics such as an amplitude, a phase, and a polarization manner of the incident wave may be changed through programmable control, to obtain a corresponding reflection wave. A switch element (for example, a diode or an RF-MEMS switch) must be introduced into a reflection unit to implement programmable control on a reflection hypersurface. The PIN diode is currently a common option for controlling a reconfigurable hypersurface. The PIN diode has a relatively wide range of radio frequency impedance and low distortion, and is widely used in the microwave radio frequency field. The switch element in the reflection unit has a plurality of different states, and switching of different states can be implemented by controlling on/off of the switch element. In on and off cases of the switch element, a structure and performance of the corresponding reflection unit changes greatly. That is, reflection units in different states have different regulation modes for characteristics such as an amplitude, a phase, and polarization of the incident wave.

2. Direct Signal Modulation by the Intelligent Surface

The intelligent surface may directly regulate wave front and various electromagnetic parameters such as a phase, an amplitude, a frequency, and even polarization of an electromagnetic signal without complex baseband processing and radio frequency receiving and sending operations. Therefore, the intelligent surface may be used to directly modulate a signal in addition to changing a radio channel environment to enhance reception quality of a third-party signal.

For example, a reflection phase/amplitude of an electromagnetic unit of the intelligent surface is not only adjusted to maximize a received signal-to-noise ratio of an incident electromagnetic wave, but also can be used for information transmission of the LIS itself. A receive end receives information about the intelligent surface by detecting a phase/amplitude change of a reflection signal of the intelligent surface.

3. Passive Intelligent Surface

Since the intelligent surface is composed of a large amount of component units and does not have a radio frequency and baseband processing capability, the intelligent surface is referred to as a passive intelligent surface.

4. Active and Passive Intelligent Surface (or Active Intelligent Surface)

Since the intelligent surface is composed of a large amount of component units and does not have a radio frequency and baseband processing capability, the base station cannot separately obtain channel information from the base station to the intelligent surface and from the intelligent surface to the terminal. A receive signal of the base station or the terminal is formed by superimposing response signals of a large amount of component units of the intelligent surface, and changing a working state of one component unit or a small amount of component units does not cause a significant change of the receive signal. A possible measurement scheme is to install a small amount of active component units in the intelligent surface, so that the intelligent surface can perform channel measurement and feedback. The base station calculates a reasonable intelligent surface configuration parameter from limited channel information by using a compression sensing or deep learning algorithm. An intelligent surface-based communications system needs an efficient channel measurement mechanism, to improve end-to-end signal quality as much as possible while ensuring low complexity of the intelligent surface. This intelligent surface on which some active components are installed has a capability of receiving and even sending a signal, and is an active and passive intelligent surface (or an active intelligent surface).

A traditional relay device includes a layer-1 relay, a layer-3 relay, an amplification and forwarding relay, a transparent forwarding relay, or the like. The LIS may be regarded as a new type of relay.

With reference to the accompanying drawings, the working state switching method provided in the embodiments of this application is described in detail by using specific embodiments and application scenarios.

Figure 3:
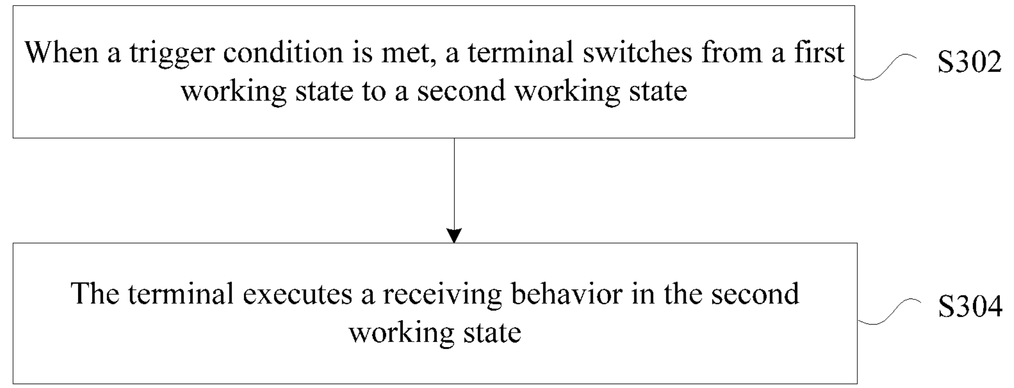
FIG. 3 is a flowchart of a working state switching method according to an embodiment of this application.

An embodiment of this application provides a working state switching method. FIG. 3 is a flowchart of a working state switching method according to an embodiment of this application. As shown in FIG. 3, the method includes the following steps:

Step S302: When a trigger condition is met, a terminal switches from working in a first working state to working in a second working state.

Step S304: The terminal executes a receiving behavior in the second working state.

The first working state means that the terminal is in a first state on a first downlink, and the second working state means that the terminal is in a second state on a second downlink;

the first downlink or the second downlink includes at least one of the following: a downlink A, a downlink B, and a downlink C, where the downlink A is a link on which a network side device sends information to the terminal, the downlink B is a link on which a large intelligent surface LIS or a relay device sends information to the terminal by changing a signal feature of the downlink A, and the downlink C is a link on which the LIS or the relay device directly sends information to the terminal; and the trigger condition includes at least one of the following:

(1) target signaling is received, where the target signaling instructs the terminal to switch from the first working state to the second working state; and (2) a target timer in the first working state expires.

In the foregoing steps S302 and S304, in a case that the trigger condition is met, the terminal may switch from the first working state to the second working state, where a downlink in the first working state and the second working state may be a link on which the network side device sends information to the terminal, or a link on which the large intelligent surface LIS or the relay device sends information to the terminal by changing a signal feature of the downlink A, or a link on which the LIS or the relay device directly sends information to the terminal. For example, if receiving on the downlinks B and C is simpler than receiving on the downlink A, the terminal may only need to receive signals/data of the downlinks B and C and a small amount of measurement on the downlink A when there is no data transmission or there is low-speed data transmission, thereby saving power of the terminal without affecting transmission efficiency. Certainly, this is merely descriptions of an example of a feasible implementation of this embodiment of this application. That is, in this application, in a system including an LIS and a base station, the terminal can work on different downlink logical links and switch between different downlink logical links according to a requirement, thereby balancing transmission efficiency and power saving of the terminal.

Optionally, the first state or the second state in this embodiment of this application includes at least one of the following: an RRC idle state, an inactive state, and a connected state. Based on this, In a specific application scenario the first working state or the second working state in this embodiment of this application may be an idle state or an inactive state (idle/inactive state) on the downlink A, a connected state on the downlink B, an idle state or an inactive state on the downlink C, and a connected state on the downlink C. Certainly, the first working state or the second working state is an example working state in this embodiment of this application. In another application scenario, the first working state or the second working state may be alternatively a connected state on the downlink A, an idle state or an inactive state on the downlink B, and the like.

In addition, it should be noted that the LIS in this embodiment of this application may be an active LIS or a passive LIS, and the relay device may be an active relay device or a passive relay device.

The following describes this application with reference to a type of the LIS or the relay device and a specific situation between the first working state and the second working state.

Manner 1-1: In a case that the LIS is a passive LIS or the relay device is a passive relay device, and the first working state is that the terminal is in an idle state or an inactive state on the downlink A, that a terminal switches from working in a first working state to working in a second working state in step S302 in this embodiment of this application includes:

Step S304-11: The terminal monitors first signaling on the downlink A.

Step S304-12: The terminal switches from working in the first working state to working in the second working state according to the first signaling, where the second working state is that the terminal is in a connected state on the downlink B, or the second working state is that the terminal is in a connected state on the downlink A.

Figure 4:
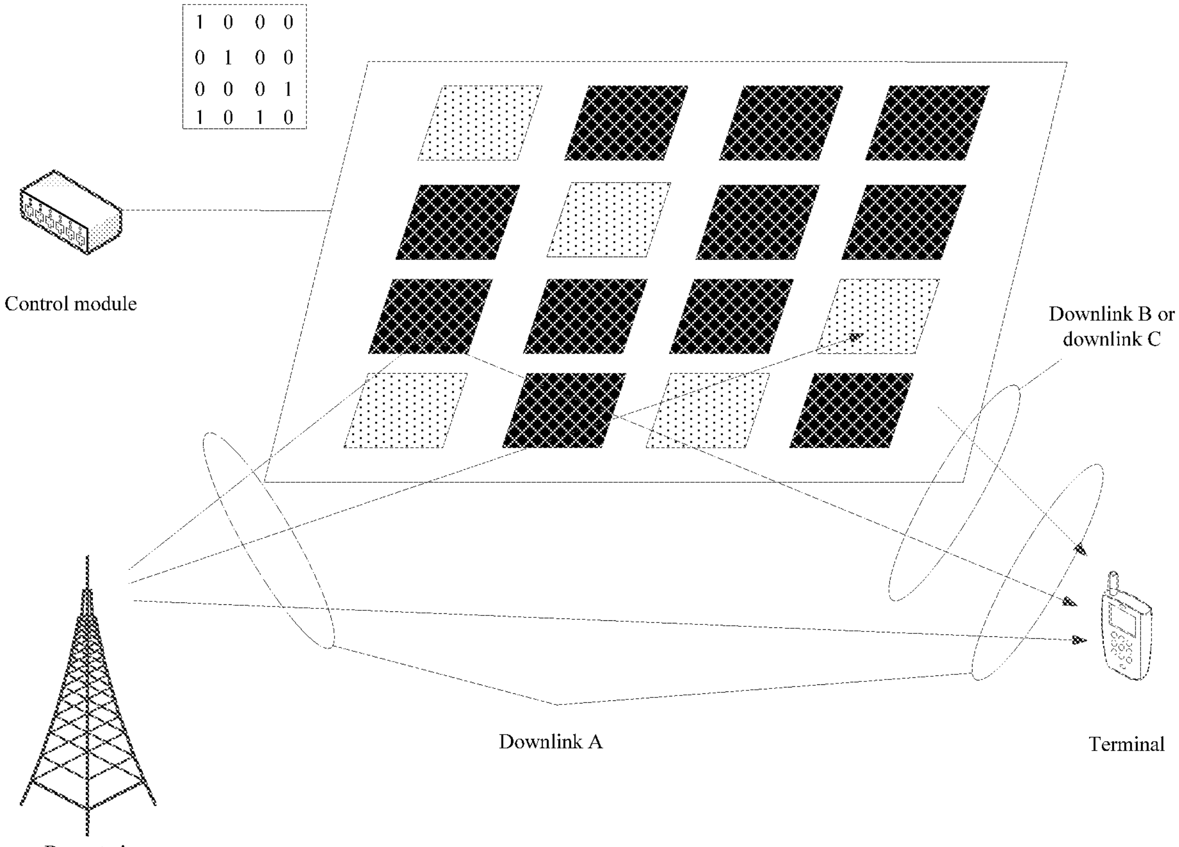
FIG. 4 is a schematic diagram of a link between an intelligent surface device, a base station, and a terminal according to an embodiment of this application.

It should be noted that, for the passive LIS or relay device, a large system including the intelligent surface or the relay device and a base station has two downlinks and one uplink, as shown in FIG. 4:

Downlink A: The base station sends information about the base station to the terminal (including impact of the LIS or the relay device on a radio channel between the base station and the terminal), where the downlink A is a radio logical link on which the base station communicates with the terminal, and on a physical link corresponding to the downlink A, the base station sends a first-type downlink signal to the terminal. The first-type downlink signal includes control information and data information.

Downlink B: The LIS or the relay device sends information about the LIS or the relay device to the terminal by changing the signal feature of the downlink A, for example, a phase or an amplitude, where the downlink B is a radio logical link on which the LIS or the relay device communicates with the terminal, and for the passive LIS or relay device, a physical link of the downlink B carries the information about the intelligent surface or the relay device by modulating, by the intelligent surface or the relay device, a parameter (including at least one of a phase, an amplitude, and a polarization direction) of a second-type downlink signal sent by the base station. The second-type downlink signal may be a downlink signal such as a physical downlink control channel (PDCCH) or a physical downlink shared channel (PDSCH) sent by the base station, or a signal that does not carry data sent in an idle state, for example, a single-frequency signal. The information about the intelligent surface or the relay device may be information generated by the intelligent surface or the relay device itself or information from the base station (for example, simple control information or small data).

In a case that the second working state is that the terminal is in a connected state on the downlink B, configuration information of the second working state is notified by using a system message or the first signaling, where the system message is a system message in the first working state.

Based on this manner 1-1, in a specific application scenario, the first working state is that the terminal is in an idle/inactive state on the downlink A. In the first working state, the terminal may perform the following steps of the method:

Step S11: The terminal periodically measures a synchronization signal/reference signal on the downlink A.

Step S12: The terminal monitors the first signaling on the downlink A, such as paging, where the first signaling indicates whether the terminal needs to enter the second working state, and the second working state is that the terminal is in a connected state on the downlink B, or the second working state is that the terminal is in a connected state on the downlink A.

It should be noted that transmission configuration information of the second working state is notified to the terminal by using the system message in the first working state or the first signaling, for example, paging. The configuration information includes time domain and frequency domain information for receiving downlink information by the terminal in the second working state, modulation and coding scheme (MCS)-related information, a relationship between a signal feature change such as a phase/an amplitude and represented information, and the like.

Manner 1-2: In a case that the LIS is a passive LIS or the relay device is a passive relay device, and the first working state is that the terminal is in a connected state on the downlink B, a manner in which a terminal switches from working in a first working state to working in a second working state in step S302 in this embodiment of this application may further include:

Step S304-21: The terminal monitors second signaling on the downlink B.

Step S304-22: The terminal switches from working in the first working state to working in the second working state according to the second signaling, where the second working state is that the terminal is in an idle state or an inactive state on the downlink A, or the second working state is that the terminal is in a connected state on the downlink A.

It should be noted that, data transmission in the first working state is implemented by changing a phase, an amplitude, or a frequency of a dedicated signal on the downlink A or by changing a phase, an amplitude, or a frequency of a non-dedicated signal on the downlink A.

In addition, the first working state is that the terminal is in a connected state on the downlink B, and the first working state may be a working state that the terminal enters during low-speed data transmission. Based on this, in this manner 1-2, in a specific application scenario, the terminal may enter the first working state according to an indication of the first signaling in the second working state (the terminal is in an idle state or an inactive state on the downlink A), or according to an indication of the second signaling in the second working state (the terminal is in a connected state on the downlink A).

Uplink sending in the first working state in this manner 1-2 is performed by using at least one of the following two types of uplinks:

- a link on which the terminal indirectly sends information to the LIS or the relay device, where the network side device receives the information sent by the terminal and forwards the information to the LIS or the relay device; or the uplink is a radio logical link from the terminal to the LIS or the relay device; and
- a link on which the terminal directly sends information to the network side device.

It should be noted that data transmission in the first working state in this manner 1-2 may be implemented by changing a signal feature such as a phase/an amplitude of the dedicated signal on the downlink A, or by changing a feature such as a phase/an amplitude of an always on signal on the downlink A such as a synchronization signal and a PBCH block (SSB), a SIB1, a channel state information reference signal (CSI-RS)/a phase reference signal (Tracking Reference Signal, TRS) in an idle state.

In addition, mobility management in the first working state is: the terminal periodically measures the synchronization signal/reference signal on the downlink A.

Optionally, the terminal monitors the first signaling on the downlink A, such as paging, where the first signaling indicates whether the terminal needs to enter the second working state.

In addition, based on this manner 1-2, in a case that the LIS is a passive LIS or the relay device is a passive relay device, and the first working state is that the terminal is in a connected state on the downlink B, a manner in which a terminal switches from working in a first working state to working in a second working state in this embodiment of this application may further include:

Step S304-31: In a case that a first timer in the first working state expires, the terminal switches from working in the first working state to working in the second working state, where the second working state is that the terminal is in an idle state or an inactive state on the downlink A, or the second working state is that the terminal is in a connected state on the downlink A. If the terminal receives scheduling signaling in the first working state, for example, scheduling signaling indicating a newly transmitted packet, the first timer is started or restarted.

Manner 1-3: In a case that the LIS is a passive LIS or the relay device is a passive relay device, and the first working state is that the terminal is in a connected state on the downlink A, a manner in which a terminal switches from working in a first working state to working in a second working state in step S302 in this embodiment of this application may further include:

Step S304-41: The terminal monitors third signaling on the downlink A.

Step S304-42: The terminal switches from working in the first working state to working in the second working state according to the third signaling, where the second working state is that the terminal is in an idle state or an inactive state on the downlink A, or the second working state is that the terminal is in a connected state on the downlink B.

Based on this manner 1-3, in a case that the LIS is a passive LIS or the relay device is a passive relay device, and the first working state is that the terminal is in a connected state on the downlink A, a manner in which a terminal switches from working in a first working state to working in a second working state in step S302 in this embodiment of this application may further include:

Step S304-51: In a case that a second timer in the first working state expires, the terminal switches from working in the first working state to working in the second working state, where the second working state is that the terminal is in an idle state or an inactive state on the downlink A, or the second working state is that the terminal is in a connected state on the downlink B. If the terminal receives scheduling signaling in the first working state, for example, scheduling signaling indicating a newly transmitted packet, the second timer is started or restarted.

It should be noted that, the first working state is that the terminal is in a connected state on the downlink A, and the first working state may be a working state that the terminal enters during high-speed data transmission. Based on this, in this manner 1-3, in a specific application scenario, the terminal enters the first working state according to an indication of the first signaling in the second working state (the terminal is in an idle state or an inactive state on the downlink A), or according to an indication of the third signaling in the second working state (the terminal is in a connected state on the downlink B).

Optionally, uplink sending in the first working state is performed by using at least one of the following two types of uplinks:

- a link on which the terminal indirectly sends information to the LIS or the relay device, where the network side device receives the information sent by the terminal and forwards the information to the LIS or the relay device; and
- a link on which the terminal directly sends information to the network side device.

In this manner 1-3, transmission configuration information of the second working state may be notified to the terminal by using signaling in the first working state, for example, RRC signaling. The configuration information includes: time domain and frequency domain information for receiving downlink information by the terminal in the second working state, MCS-related information, a relationship between a signal feature change such as a phase/an amplitude and represented information, and the like.

Mobility management in the first working state in this manner 1-3 is: the terminal periodically measures the synchronization signal/reference signal on the downlink A.

Optionally, the terminal monitors the first signaling on the downlink A, such as paging, where the paging indicates whether the terminal needs to enter the second working state.

In the manner 1-1 to the manner 1-3, this application is described from a perspective of the passive LIS or the passive relay device. The following describes this application from a perspective of the active LIS or the active relay device.

Manner 2-1: In a case that the LIS is an active LIS or the relay device is an active relay device, and the first working state is that the terminal is in an idle state or an inactive state on the downlink A, a manner in which a terminal switches from working in a first working state to working in a second working state in step S302 may further include:

Step S304-61: The terminal monitors fourth signaling on the downlink A.

Step S304-62: The terminal switches from working in the first working state to working in the second working state according to the fourth signaling, where the second working state is that the terminal is in a connected state on the downlink C or the downlink A, or the second working state is that the terminal is in a connected state on the downlink A.

It should be noted that, in a case that the second working state is that the terminal is in a connected state on the downlink C or the downlink A, configuration information of the second working state is notified by using a system message or first signaling, where the system message is a system message in the first working state.

In this manner 2-1, in a specific application scenario, the terminal may further periodically measure a synchronization signal/reference signal on the downlink A, and the terminal monitors first signaling on the downlink A, such as paging, where the first signaling indicates whether the terminal needs to enter the second working state.

Transmission configuration information of the second working state is notified to the terminal by using a system message in the first state or the first signaling such as paging. The configuration information includes at least one of the following: uplink and/or downlink time domain and frequency domain information of the terminal in the second working state, uplink and downlink MCS-related information, downlink TRPID information (or an LIS ID) related to the downlink C, synchronization information (a channel raster, a sync raster, a quantity of SSBs, or the like), a quasi-co-location (QCL) information relationship (for example, a QCL relationship between an SSB/a CSI-RS/a TRS in the second working state and an SSB/a CSI-RS/a TRS in the first working state), beam information, and the like.

It should be noted that uplink sending in the first working state is implemented by using at least one of four types of uplinks, for example, a random access process is initiated when an uplink service needs to be transmitted:

(1) a link on which the terminal directly sends information to the LIS or the relay device, where the LIS or the relay device includes an active receiving module or an active transceiver module;

(2) a link on which the terminal indirectly sends information to the LIS or the relay device, where the network side device receives the information sent by the terminal and forwards the information to the LIS or the relay device; and the uplink is a radio logical link from the terminal to the LIS or the relay device, where a small quantity of active transceiver modules integrated into the intelligent surface may receive an uplink signal of the terminal;

(3) a link on which the terminal directly sends information to the network side device; and (4) a link on which the terminal indirectly sends information to the network side device, where the LIS or the relay device receives the information sent by the terminal and forwards the information to the network side device; the uplink is a logical link from the intelligent surface to the network side device, where the LIS or the relay device transmits the received information of the terminal to the network side device; and an actual physical channel between the LIS or the relay device and the network side device may be a wireless link or a wired link.

Manner 2-2: In a case that the LIS is an active LIS or the relay device is an active relay device, and the first working state is that the terminal is in a connected state on the downlink C or the downlink A, a manner in which a terminal switches from working in a first working state to working in a second working state in step S302 in this embodiment of this application may further include:

Step S304-71: The terminal monitors fifth signaling on the downlink A.

Step S304-72: The terminal switches from working in the first working state to working in the second working state according to the fifth signaling, where the second working state is that the terminal is in an idle state or an inactive state on the downlink A, or the second working state is that the terminal is in a connected state on the downlink A.

In addition, in a case that the LIS is an active LIS or the relay device is an active relay device, and the first working state is that the terminal is in a connected state on the downlink C or the downlink A, a manner in which a terminal switches from working in a first working state to working in a second working state in step S302 in this embodiment of this application may further include:

Step S304-81: In a case that a third timer in the first working state expires, the terminal switches from working in the first working state to working in the second working state, where the second working state is that the terminal is in an idle state or an inactive state on the downlink A, or the second working state is that the terminal is in a connected state on the downlink A. If the terminal receives scheduling signaling in the first working state, for example, scheduling signaling indicating a newly transmitted packet, the third timer is started or restarted.

The first working state (a connected state on the downlink C) in this manner 2-2 is generally a state that the terminal enters during low-speed data transmission. In a specific application scenario, the terminal enters the first working state according to an indication of the first signaling in the second working state (the terminal is in an idle state or an inactive state on the downlink A), or according to an indication of the third signaling in the second working state (the terminal is in a connected state on the downlink A).

If the terminal enters the first working state according to the indication of the third signaling, the terminal may determine, according to beam/SSB/CSI-RS information in the second working state (the terminal is in a connected state on the downlink A) and a first mapping table, preferably measured beam/SSB/CSI-RS information in the first working state (the terminal is in a connected state on the downlink C or the downlink A). The first mapping table defines a mapping relationship, such as a QCL relationship, between the beam/SSB/CSI-RS information in the first working state and the beam/SSB/CSI-RS information in the second working state (the terminal is in a connected state on the downlink A). A mapping relationship between different working states is defined by using the first mapping table, so that the terminal can perform downlink measurement and synchronization more quickly, to implement state switching more quickly.

If the terminal enters the first working state according to the indication of the first signaling, the terminal may determine, according to beam/SSB/CSI-RS information in the second working state (the terminal is in an idle state or an inactive state on the downlink A) and a second mapping table, preferably measured beam/SSB/CSI-RS information in the first working state (the terminal is in a connected state on the downlink C or the downlink A). The second mapping table defines a mapping relationship, such as a QCL relationship, between the beam/SSB/CSI-RS information in the second working state (the terminal is in an idle state or an inactive state on the downlink A) and the beam/SSB/CSI-RS information in the first working state (the terminal is in a connected state on the downlink C or the downlink A). A mapping relationship between different working states is defined by using the second mapping table, so that the terminal can perform downlink measurement and synchronization more quickly, to implement state switching more quickly.

Uplink sending in the first working state in this manner 2-2 is performed by using at least one of four types of uplinks:

(1) a link on which the terminal directly sends information to the LIS or the relay device, where the LIS or the relay device includes an active receiving module or an active transceiver module;

(2) a link on which the terminal indirectly sends information to the LIS or the relay device, where the network side device receives the information sent by the terminal and forwards the information to the LIS or the relay device; and the uplink is a radio logical link from the terminal to the LIS or the relay device, where a small quantity of active transceiver modules integrated into the intelligent surface may receive an uplink signal of the terminal;

(3) a link on which the terminal directly sends information to the network side device; and (4) a link on which the terminal indirectly sends information to the network side device, where the LIS or the relay device receives the information sent by the terminal and forwards the information to the network side device; the uplink is a logical link from the intelligent surface to the network side device, where the LIS or the relay device transmits the received information of the terminal to the network side device; and an actual physical channel between the LIS or the relay device and the network side device may be a wireless link or a wired link.

Uplink and downlink data transmission in the first working state in the manner 2-2 is performed by using active components of the terminal and the LIS.

Mobility management in the first working state in the manner 2-2 may be: the terminal periodically measures a synchronization signal/reference signal on the downlink A, or the terminal periodically measures a synchronization signal/reference signal on the downlink B.

Optionally, the terminal monitors the first signaling on the downlink A, such as paging, where the first signaling indicates whether the terminal needs to enter the second working state.

Manner 2-3: In a case that the LIS is an active LIS or the relay device is an active relay device, and the first working state is that the terminal is in a connected state on the downlink A, a manner in which a terminal switches from working in a first working state to working in a second working state in step S302 in this embodiment of this application may further include:

Step S304-91: The terminal monitors sixth signaling on the downlink A.

Step S304-92: The terminal switches from working in the first working state to working in the second working state according to the sixth signaling, where the second working state is that the terminal is in an idle state or an inactive state on the downlink A, or the second working state is that the terminal is in a connected state on the downlink C or the downlink A.

Based on this manner 2-3, step S304 in this embodiment of this application may further include: in a case that a fourth timer in the first working state expires, the terminal switches from working in the first working state to working in the second working state, where the second working state is that the terminal is in an idle state or an inactive state on the downlink A, or the second working state is that the terminal is in a connected state on the downlink C or the downlink A. If the terminal receives scheduling signaling in the first working state, for example, scheduling signaling indicating a newly transmitted packet, the fourth timer is started or restarted.

Optionally, the method in this embodiment of this application may further include:

Step S21: The terminal periodically measures a synchronization signal or a reference signal on the downlink A.

Optionally, the terminal sends information by using at least one of the following uplinks:

(1) a link on which the terminal directly sends information to the LIS or the relay device, where the LIS or the relay device includes an active receiving module or an active transceiver module;

(2) a link on which the terminal indirectly sends information to the LIS or the relay device, where the network side device receives the information sent by the terminal and forwards the information to the LIS or the relay device; and the uplink is a radio logical link from the terminal to the LIS or the relay device, where a small quantity of active transceiver modules integrated into the intelligent surface may receive an uplink signal of the terminal;

(3) a link on which the terminal directly sends information to the network side device; and (4) a link on which the terminal indirectly sends information to the network side device, where the LIS or the relay device receives the information sent by the terminal and forwards the information to the network side device; the uplink is a logical link from the intelligent surface to the network side device, where the LIS or the relay device transmits the received information of the terminal to the network side device; and an actual physical channel between the LIS or the relay device and the network side device may be a wireless link or a wired link.

The first working state in this manner 2-3 may be a state that the terminal enters during high-speed data transmission. In a specific application scenario, the terminal enters the first working state according to an indication of the first signaling in the second working state (the terminal is in an idle state or an inactive state on the downlink A), or according to an indication of the second signaling in the second working state (the terminal is in a connected state on the downlink C or the downlink A).

If the terminal enters the first working state according to the indication of the second signaling, the terminal may determine, according to beam/SSB/CSI-RS information in the second working state (the terminal is in an idle state or an inactive state on the downlink A) and a first mapping table, preferably measured beam/SSB/CSI-RS information in the first working state. The first mapping table defines a mapping relationship, such as a QCL relationship, between the beam/SSB/CSI-RS information in the first working state (the terminal is in an idle state or an inactive state on the downlink A) and the beam/SSB/CSI-RS information in the second working state. A mapping relationship between different working states is defined in the first mapping table, so that the terminal can perform downlink measurement and synchronization more quickly, to implement state switching more quickly.

Optionally, mobility management in the first working state may be: the terminal periodically measures the synchronization signal/reference signal on the downlink A.

Optionally, the terminal monitors the first signaling on the downlink A, such as paging, where the paging indicates whether the terminal needs to enter the second working state.

A switching manner between the manner 2-1 to the manner 2-3 is switched between three working states. The following explains a switching manner between more than three working states.

Manner 3-1: In a case that the LIS is an active LIS or the relay device is an active relay device, and the first working state is that the terminal is in an idle state or an inactive state on the downlink A, a manner in which a terminal switches from working in a first working state to working in a second working state in step S302 in this embodiment of this application may further include:

Step S304-101: The terminal monitors seventh signaling on the downlink A.

Step S304-102: The terminal switches from working in the first working state to working in the second working state according to the seventh signaling, where the second working state is that the terminal enters a target downlink and is in a connected state, and the target downlink is at least one of the following links: the downlink A, the downlink B, and the downlink C.

Based on this manner 3-1, in a case that the LIS is an active LIS or the relay device is an active relay device, and the first working state is that the terminal is in an idle state or an inactive state on the downlink A, a manner in which a terminal switches from working in a first working state to working in a second working state in step S302 in this embodiment of this application may further include: in a case that a fifth timer in the first working state expires, the terminal switches from working in the first working state to working in the second working state, where the second working state is that the terminal enters the target downlink and is in a connected state, and the target downlink is at least one of the following links: the downlink A, the downlink B, and the downlink C. If the terminal receives scheduling signaling in the first working state, for example, scheduling signaling indicating a newly transmitted packet, the fifth timer is started or restarted.

In this manner 3-1, in a specific application scenario, the method may further include: the terminal periodically measure a synchronization signal/reference signal on the downlink A, and the terminal monitors first signaling on the downlink A, such as paging, where the first signaling indicates whether the terminal needs to enter any one of other N−1 states.

Manner 3-2: In a case that the LIS is an active LIS or the relay device is an active relay device, and the first working state is that the terminal is in an idle state or an inactive state on the downlink C, a manner in which a terminal switches from working in a first working state to working in a second working state in step S302 in this embodiment of this application may further include:

Step S304-111: The terminal monitors eighth signaling on the downlink A.

Step S304-112: The terminal switches from working in the first working state to working in the second working state according to the eighth signaling, where the second working state is that the terminal enters a target downlink and is in a connected state.

In this manner 3-2, in a specific application scenario, the terminal may periodically measure a synchronization signal/reference signal (for the active LIS) on the downlink C, and the terminal may monitor second signaling on the downlink C, such as paging, where the second signaling indicates whether the terminal needs to enter any one of other N−1 states.

Manner 3-3: In a case that the LIS is an active LIS or the relay device is an active relay device, and the first working state is that the terminal enters a target downlink and is in a connected state, a manner in which a terminal switches from working in a first working state to working in a second working state in step S302 in this embodiment of this application may further include:

Step S304-121: The terminal monitors ninth signaling on the target link.

Step S304-122: The terminal switches from working in the first working state to working in the second working state according to the ninth signaling, where the second working state is that the terminal is in an idle state or an inactive state on the downlink C, or the second working state is that the terminal is in an idle state or an inactive state on the downlink A or the downlink C.

Optionally, based on this manner 3-3, step S304 in this embodiment of this application may be alternatively: in a case that a sixth timer in the first working state expires, the terminal switches from working in the first working state to working in the second working state, where the second working state is that the terminal is in an idle state or an inactive state on the downlink C, or the second working state is that the terminal is in an idle state or an inactive state on the downlink A or the downlink C. If the terminal receives scheduling signaling in the first working state, for example, scheduling signaling indicating a newly transmitted packet, the sixth timer is started or restarted.

Optionally, the terminal periodically measures a synchronization signal or a reference signal on the downlink C or the downlink A.

Optionally, the terminal sends information by using at least one of the following uplinks:

(1) a link on which the terminal directly sends information to the LIS or the relay device, where the LIS or the relay device includes an active receiving module or an active transceiver module;

(2) a link on which the terminal indirectly sends information to the LIS or the relay device, where the network side device receives the information sent by the terminal and forwards the information to the LIS or the relay device; and the uplink is a radio logical link from the terminal to the LIS or the relay device, where a small quantity of active transceiver modules integrated into the intelligent surface may receive an uplink signal of the terminal;

(3) a link on which the terminal directly sends information to the network side device; and (4) a link on which the terminal indirectly sends information to the network side device, where the LIS or the relay device receives the information sent by the terminal and forwards the information to the network side device; the uplink is a logical link from the intelligent surface to the network side device, where the LIS or the relay device transmits the received information of the terminal to the network side device; and an actual physical channel between the LIS or the relay device and the network side device may be a wireless link or a wired link.

In the foregoing manner 3-3, in a specific application scenario, the terminal enters a connected state according to an indication of the first signaling in the second working state (the terminal is in an idle state or an inactive state on the downlink C) or an indication of the second signaling, such as paging, in the second working state (the terminal is in an idle state or an inactive state on the downlink A or the downlink C), or an indication of signaling in another sub-state of the connected state (works on another downlink), and selects at least one of downlinks as the target downlink and at least one of uplinks as a target uplink.

In an optional implementation of this embodiment of this application, the steps of the method in this embodiment of this application may further include:

Step S41: In a case of switching from the first working state to the second working state, the terminal determines target information in the second working state according to target information in the first working state and a first mapping table.

The target information includes at least one of the following: beam information, a synchronization signal block SSB, a channel state information reference signal CSI-RS, and quasi co-location QCL information; and the first mapping table is used to indicate a mapping relationship between the target information in the first working state and the target information in the second working state.

In an optional implementation of this embodiment of this application, the steps of the method in this embodiment of this application may further include:

Step S42: In a case of switching from a first uplink to a second uplink, the terminal determines target information of the second uplink according to target information of the first uplink and a second mapping table.

The target information includes at least one of the following: beam information and QCL information;

the first uplink or the second uplink includes at least one of the following:

(1) a link on which the terminal directly sends information to the LIS or the relay device, where the LIS or the relay device includes an active receiving module or an active transceiver module;

(2) a link on which the terminal indirectly sends information to the LIS or the relay device, where the network side device receives the information sent by the terminal and forwards the information to the LIS or the relay device; and the uplink is a radio logical link from the terminal to the LIS or the relay device, where a small quantity of active transceiver modules integrated into the intelligent surface may receive an uplink signal of the terminal;

(3) a link on which the terminal directly sends information to the network side device; and (4) a link on which the terminal indirectly sends information to the network side device, where the LIS or the relay device receives the information sent by the terminal and forwards the information to the network side device; the uplink is a logical link from the intelligent surface to the network side device, where the LIS or the relay device transmits the received information of the terminal to the network side device; and an actual physical channel between the LIS or the relay device and the network side device may be a wireless link or a wired link; and the second mapping table is used to indicate a mapping relationship between target information in the first working state and target information in the second working state.

For the step S41 and the step S42, a specific application scenario may be as follows:

If the terminal is switched from the downlink C (an idle state, an inactive state, or a connected state) to the downlink A (an idle state, an inactive state, or a connected state), the terminal may determine, according to (the strongest N pieces, where N is greater than or equal to 1) beam/SSB/CSI-RS information on the downlink C and the first mapping table, preferably measured beam/SSB/CSI-RS information on the downlink A. The first mapping table defines a mapping relationship, such as a QCL relationship, between the beam/SSB/CSI-RS on the downlink C and the beam/SSB/CSI-RS information on the downlink A.

On the contrary, if the terminal is switched from the downlink A (an idle state, an inactive state, or a connected state) to the downlink C (an idle state, an inactive state, or a connected state), the terminal may determine, according to (the strongest N pieces, where N is greater than or equal to 1) beam/SSB/CSI-RS information on the downlink A and the first mapping table, preferably measured beam/SSB/CSI-RS information on the downlink C. The first mapping table defines a mapping relationship, such as a QCL relationship, between the beam/SSB/CSI-RS on the downlink C and the beam/SSB/CSI-RS information on the downlink A.

If the terminal is switched from the uplink 1 or 2 (an idle state, an inactive state, or a connected state) to the uplink 3 or 4 (an idle state, an inactive state, or a connected state), the terminal may determine, according to (the strongest N pieces, where N is greater than or equal to 1) sending beam information on the uplink 1 or 2 and the second mapping table, a sending beam on the preferred used uplink 3 or 4 (an advantage: switching to a different uplink more quickly).

The second mapping table defines a mapping relationship, such as a QCL relationship, between the sending beam on the uplink 1 or 2 and the sending beam on the uplink 3 or 4.

On the contrary, if the terminal is switched from the uplink 3 or 4 (an idle state, an inactive state, or a connected state) to the uplink 1 or 2 (an idle state, an inactive state, or a connected state), the terminal may determine, according to (the strongest N pieces, where N is greater than or equal to 1) sending beam information on the uplink 3 or 4 and the second mapping table, a sending beam on the preferred used uplink 1 or 2 (an advantage: switching to a different uplink more quickly).

The second mapping table defines a mapping relationship, such as a QCL relationship, between the sending beam on the uplink 1 or 2 and the sending beam on the uplink 3 or 4.

The uplink 1 is a link from the terminal to the LIS (assuming that the LIS is active), the uplink 2 is a link from the terminal to the LIS and then to the base station (assuming that the LIS is active), the uplink 3 is a link from the terminal to the base station and then to the LIS, and the uplink 4 is a link from the terminal to the base station.

In addition, because the LIS is passive and does not have a capability of receiving radio information, in an LIS downlink B, the terminal cannot feed back an ACK/a NACK to the LIS. Therefore, this embodiment of this application further provides the following manners:

Step S51: The terminal feeds back ACK/NACK related information to the base station, and the base station forwards the ACK/NACK to the LIS, for example, the base station and the LIS are in a wired or wireless connection.

The ACK/NACK related information further includes an indication of a moment at which an ACK/NACK of a data packet is to be sent by the LIS, or an indication does not need to be performed each time according to a preset mapping rule.

Step S52: The terminal feeds back channel state feedback information such as a CQI of the LIS link B to the base station, and the base station forwards the feedback information to the LIS.

Step S53: The terminal adds, to other data sent by the terminal to the base station, the ACK/NACK/channel state feedback information of the LIS link, or separately sends the ACK/NACK/channel state feedback information.

In this embodiment of this application, when there is no data transmission or there is low-speed data transmission, the terminal only needs to receive signals/data on the downlinks B and C and a small amount of measurement on the downlink A, and receiving on the downlinks B and C is simpler than receiving on the downlink A, thereby saving power of the terminal. In addition, the terminal directly communicates with the LIS, the downlink C and the uplinks 1 and 2 are used. Compared with direct communication between the base station and the terminal, this manner is more flexibly. In some conditions, link quality is better because the LIS is closer to the terminal.

It should be noted that the working state switching method provided in the embodiments of this application may be performed by a working state switching apparatus, or a control module that is in the working state switching apparatus and that is configured to perform the working state switching method. In the embodiments of this application, an example in which the working state switching apparatus performs the working state switching method is used to describe the working state switching apparatus provided in the embodiments of this application.

Figure 5:
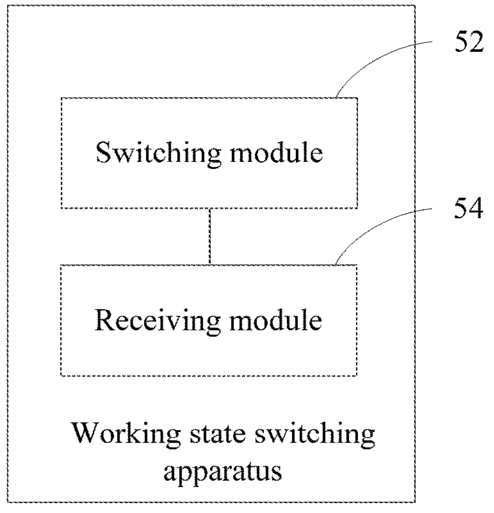
FIG. 5 is a schematic structural diagram of a working state switching apparatus according to an embodiment of this application.

FIG. 5 is a schematic structural diagram of a working state switching apparatus according to an embodiment of this application. The apparatus is applied to a terminal. As shown in FIG. 5, the apparatus includes:

- a switching module 52, configured to: when a trigger condition is met, switch from a first working state to a second working state; and
- a receiving module 54, configured to execute a receiving behavior in the second working state, where
- the first working state means that the terminal is in a first state on a first downlink, and the second working state means that the terminal is in a second state on a second downlink;
- the first downlink or the second downlink includes at least one of the following: a downlink A, a downlink B, and a downlink C, where the downlink A is a link on which a network side device sends information to the terminal, the downlink B is a link on which a large intelligent surface LIS or a relay device sends information to the terminal by changing a signal feature of the downlink A, and the downlink C is a link on which the LIS or the relay device directly sends information to the terminal; and
- the trigger condition includes at least one of the following:
- target signaling is received, where the target signaling instructs the terminal to switch from the first working state to the second working state; and
- a target timer in the first working state expires.

In this embodiment of this application, in a case that a trigger condition is met, an apparatus may switch from a first working state to a second working state, where a downlink in the first working state and the second working state may be a link on which a network side device sends information to a terminal, or a link on which a large intelligent surface LIS or a relay device sends information to the terminal by changing a signal feature of a downlink A, or a link on which the LIS or the relay device directly sends information to the terminal. That is, according to this application, in a system including an LIS and a base station, the terminal can work on different downlink logical links and switch between different downlink logical links according to a requirement, thereby balancing transmission efficiency and power saving of the terminal.

Optionally, the first state or the second state in this embodiment of this application includes at least one of the following: an idle state, an inactive state, and a connected state.

Optionally, in a case that the LIS is a passive LIS or the relay device is a passive relay device, and the first working state is that the terminal is in an idle state or an inactive state on the downlink A, the switching module in this embodiment of this application includes: a first monitoring unit, configured to monitor first signaling on the downlink A; and a first switching unit, configured to switch from working in the first working state to working in the second working state according to the first signaling, where the second working state is that the terminal is in a connected state on the downlink B, or the second working state is that the terminal is in a connected state on the downlink A.

Optionally, in a case that the second working state is that the terminal is in a connected state on the downlink B, configuration information of the second working state is notified by using a system message or the first signaling, where the system message is a system message in the first working state.

Optionally, in a case that the LIS is a passive LIS or the relay device is a passive relay device, and the first working state is that the terminal is in a connected state on the downlink B, the switching module in this embodiment of this application includes: a second monitoring unit, configured to monitor second signaling on the downlink B; and a second switching unit, configured to switch from working in the first working state to working in the second working state according to the second signaling, where the second working state is that the terminal is in an idle state or an inactive state on the downlink A, or the second working state is that the terminal is in a connected state on the downlink A.

Optionally, data transmission in the first working state in this embodiment of this application is implemented by changing a phase, an amplitude, or a frequency of a dedicated signal on the downlink A or by changing a phase, an amplitude, or a frequency of a non-dedicated signal on the downlink A.

Optionally, in a case that the LIS is a passive LIS or the relay device is a passive relay device, and the first working state is that the terminal is in a connected state on the downlink B, the switching module in this embodiment of this application includes: a third switching unit, configured to: in a case that a first timer in the first working state expires, switch from working in the first working state to working in the second working state, where the second working state is that the terminal is in an idle state or an inactive state on the downlink A, or the second working state is that the terminal is in a connected state on the downlink A. If the terminal receives scheduling signaling in the first working state, for example, scheduling signaling indicating a newly transmitted packet, the first timer is started or restarted.

Optionally, in a case that the LIS is a passive LIS or the relay device is a passive relay device, and the first working state is that the terminal is in a connected state on the downlink A, the switching module in this embodiment of this application includes: a third monitoring unit, configured to monitor third signaling on the downlink A; and a fourth switching unit, configured to switch from working in the first working state to working in the second working state according to the third signaling, where the second working state is that the terminal is in an idle state or an inactive state on the downlink A, or the second working state is that the terminal is in a connected state on the downlink B.

Optionally, in a case that the LIS is a passive LIS or the relay device is a passive relay device, and the first working state is that the terminal is in a connected state on the downlink A, the switching module in this embodiment of this application includes: a fifth switching unit, configured to: in a case that a second timer in the first working state expires, switch from working in the first working state to working in the second working state, where the second working state is that the terminal is in an idle state or an inactive state on the downlink A, or the second working state is that the terminal is in a connected state on the downlink B. If the terminal receives scheduling signaling in the first working state, for example, scheduling signaling indicating a newly transmitted packet, the second timer is started or restarted.

Optionally, the apparatus in this embodiment of this application may further include: a first sending module, configured to send information by using at least one of the following uplinks: a link on which the terminal indirectly sends information to the LIS or the relay device, where the network side device receives the information sent by the terminal and forwards the information to the LIS or the relay device; and a link on which the terminal directly sends information to the network side device.

Optionally, in a case that the LIS is an active LIS or the relay device is an active relay device, and the first working state is that the terminal is in an idle state or an inactive state on the downlink A, the switching module in this embodiment of this application includes: a fourth monitoring unit, configured to monitor fourth signaling on the downlink A; and a sixth switching unit, configured to switch from working in the first working state to working in the second working state according to the fourth signaling, where the second working state is that the terminal is in a connected state on the downlink C or the downlink A, or the second working state is that the terminal is in a connected state on the downlink A.

Optionally, in a case that the second working state is that the terminal is in a connected state on the downlink C or the downlink A, configuration information of the second working state is notified by using a system message or first signaling, where the system message is a system message in the first working state.

Optionally, in a case that the LIS is an active LIS or the relay device is an active relay device, and the first working state is that the terminal is in a connected state on the downlink C or the downlink A, the switching module in this embodiment of this application includes: a fifth monitoring unit, configured to monitor fifth signaling on the downlink A; and a seventh switching unit, configured to switch from working in the first working state to working in the second working state according to the fifth signaling, where the second working state is that the terminal is in an idle state or an inactive state on the downlink A, or the second working state is that the terminal is in a connected state on the downlink A.

Optionally, in a case that the LIS is an active LIS or the relay device is an active relay device, and the first working state is that the terminal is in a connected state on the downlink C or the downlink A, the switching module in this embodiment of this application includes: an eighth switching unit, configured to: in a case that a third timer in the first working state expires, switch from working in the first working state to working in the second working state, where the second working state is that the terminal is in an idle state or an inactive state on the downlink A, or the second working state is that the terminal is in a connected state on the downlink A. If the terminal receives scheduling signaling in the first working state, for example, scheduling signaling indicating a newly transmitted packet, the third timer is started or restarted.

Optionally, in a case that the LIS is an active LIS or the relay device is an active relay device, and the first working state is that the terminal is in a connected state on the downlink A, the switching module in this embodiment of this application includes: a sixth monitoring unit, configured to monitor sixth signaling on the downlink A; and a ninth switching unit, configured to switch from working in the first working state to working in the second working state according to the sixth signaling, where the second working state is that the terminal is in an idle state or an inactive state on the downlink A, or the second working state is that the terminal is in a connected state on the downlink C or the downlink A.

Optionally, the switching module in this embodiment of this application includes: a tenth switching unit, configured to: in a case that a fourth timer in the first working state expires, switch from working in the first working state to working in the second working state, where the second working state is that the terminal is in an idle state or an inactive state on the downlink A, or the second working state is that the terminal is in a connected state on the downlink C or the downlink A. If the terminal receives scheduling signaling in the first working state, for example, scheduling signaling indicating a newly transmitted packet, the fourth timer is started or restarted.

Optionally, the apparatus in this embodiment of this application further includes: a first measurement module, configured to periodically measure a synchronization signal or a reference signal on the downlink A.

Optionally, the apparatus in this embodiment of this application further includes: a second sending module, configured to send information by using at least one of the following uplinks:

(1) a link on which the terminal directly sends information to the LIS or the relay device, where the LIS or the relay device includes an active receiving module or an active transceiver module;

(2) a link on which the terminal indirectly sends information to the LIS or the relay device, where the network side device receives the information sent by the terminal and forwards the information to the LIS or the relay device; and the uplink is a radio logical link from the terminal to the LIS or the relay device, where a small quantity of active transceiver modules integrated into the intelligent surface may receive an uplink signal of the terminal;

(3) a link on which the terminal directly sends information to the network side device; and (4) a link on which the terminal indirectly sends information to the network side device, where the LIS or the relay device receives the information sent by the terminal and forwards the information to the network side device; the uplink is a logical link from the intelligent surface to the network side device, where the LIS or the relay device transmits the received information of the terminal to the network side device; and an actual physical channel between the LIS or the relay device and the network side device may be a wireless link or a wired link.

Optionally, in a case that the LIS is an active LIS or the relay device is an active relay device, and the first working state is that the terminal is in an idle state or an inactive state on the downlink A, the switching module in this embodiment of this application includes: a seventh monitoring unit, configured to monitor seventh signaling on the downlink A; and an eleventh switching unit, configured to switch from working in the first working state to working in the second working state according to the seventh signaling, where the second working state is that the terminal enters a target downlink and is in a connected state, and the target downlink is at least one of the following links: the downlink A, the downlink B, and the downlink C.

Optionally, in a case that the LIS is an active LIS or the relay device is an active relay device, and the first working state is that the terminal is in an idle state or an inactive state on the downlink A, the switching module in this embodiment of this application includes: a twelfth switching unit, configure to: in a case that a fifth timer in the first working state expires, switch from working in the first working state to working in the second working state, where the second working state is that the terminal enters the target downlink and is in a connected state, and the target downlink is at least one of the following links: the downlink A, the downlink B, and the downlink C. If the terminal receives scheduling signaling in the first working state, for example, scheduling signaling indicating a newly transmitted packet, the fifth timer is started or restarted.

Optionally, in a case that the LIS is an active LIS or the relay device is an active relay device, and the first working state is that the terminal is in an idle state or an inactive state on the downlink C, the switching module in this embodiment of this application includes: an eighth monitoring unit, configured to monitor eighth signaling on the downlink A; and a thirteenth switching unit, configured to switch from working in the first working state to working in the second working state according to the eighth signaling, where the second working state is that the terminal enters a target downlink and is in a connected state.

Optionally, in a case that the LIS is an active LIS or the relay device is an active relay device, and the first working state is that the terminal enters a target downlink and is in a connected state, the switching module in this embodiment of this application includes: a ninth monitoring unit, configured to monitor ninth signaling on the target link; and a fourteenth switching unit, configured to switch from working in the first working state to working in the second working state according to the ninth signaling, where the second working state is that the terminal is in an idle state or an inactive state on the downlink C, or the second working state is that the terminal is in an idle state or an inactive state on the downlink A or the downlink C.

Optionally, the switching module in this embodiment of this application includes: a fifteenth switching unit, configured to: in a case that a sixth timer in the first working state expires, switch from working in the first working state to working in the second working state, where the second working state is that the terminal is in an idle state or an inactive state on the downlink C, or the second working state is that the terminal is in an idle state or an inactive state on the downlink A or the downlink C. If the terminal receives scheduling signaling in the first working state, for example, scheduling signaling indicating a newly transmitted packet, the sixth timer is started or restarted.

Optionally, the apparatus in this embodiment of this application further includes: a second measurement module, configured to periodically measure a synchronization signal or a reference signal on the downlink C or the downlink A.

Optionally, the apparatus in this embodiment of this application further includes: a third sending module, configured to send information by using at least one of the following uplinks:

(1) a link on which the terminal directly sends information to the LIS or the relay device, where the LIS or the relay device includes an active receiving module or an active transceiver module;

(2) a link on which the terminal indirectly sends information to the LIS or the relay device, where the network side device receives the information sent by the terminal and forwards the information to the LIS or the relay device; and the uplink is a radio logical link from the terminal to the LIS or the relay device, where a small quantity of active transceiver modules integrated into the intelligent surface may receive an uplink signal of the terminal;

(3) a link on which the terminal directly sends information to the network side device; and (4) a link on which the terminal indirectly sends information to the network side device, where the LIS or the relay device receives the information sent by the terminal and forwards the information to the network side device; the uplink is a logical link from the intelligent surface to the network side device, where the LIS or the relay device transmits the received information of the terminal to the network side device; and an actual physical channel between the LIS or the relay device and the network side device may be a wireless link or a wired link.

Optionally, the apparatus in this embodiment of this application may further include: a first determining module, configured to: in a case of switching from the first working state to the second working state, determine target information in the second working state according to target information in the first working state and a first mapping table, where the target information includes at least one of the following: beam information, a synchronization signal block SSB, a channel state information reference signal CSI-RS, and quasi co-location QCL information; and the first mapping table is used to indicate a mapping relationship between the target information in the first working state and the target information in the second working state.

Optionally, the apparatus in this embodiment of this application further includes: a second determining module, configured to: in a case of switching from a first uplink to a second uplink, determine target information of the second uplink according to target information of the first uplink and a second mapping table, where the target information includes at least one of the following: beam information and QCL information; and the first uplink or the second uplink includes at least one of the following: a link on which the terminal directly sends information to the LIS or the relay device, where the LIS or the relay device includes an active receiving module or an active transceiver module; a link on which the terminal indirectly sends information to the LIS or the relay device, where the network side device receives the information sent by the terminal and forwards the information to the LIS or the relay device; a link on which the terminal directly sends information to the network side device; and a link on which the terminal indirectly sends information to the network side device, where the LIS or the relay device receives the information sent by the terminal and forwards the information to the network side device; and the second mapping table is used to indicate a mapping relationship between target information in the first working state and target information in the second working state.

The working state switching apparatus in this embodiment of this application may be an apparatus, or may be a component, an integrated circuit, or a chip in a terminal. The apparatus may be a mobile terminal, or a non-mobile terminal. For example, the mobile device may include but is not limited to the types of the terminal 11 listed above, and the non-mobile terminal may be a server, a network attached storage (NAS), a personal computer (PC), a television (TV), an automated teller machine, or a self-service machine. This is not specifically limited in this embodiment of this application.

The working state switching apparatus in this embodiment of this application may be an apparatus with an operating system. The operating system may be an Android operating system, an iOS operating system, or another possible operating system. This is not specifically limited in this embodiment of this application.

The working state switching apparatus provided in this embodiment of this application can implement the processes implemented in the method embodiment in FIG. 3, and achieve a same technical effect. To avoid repetition, details are not described herein again.

Figure 6:
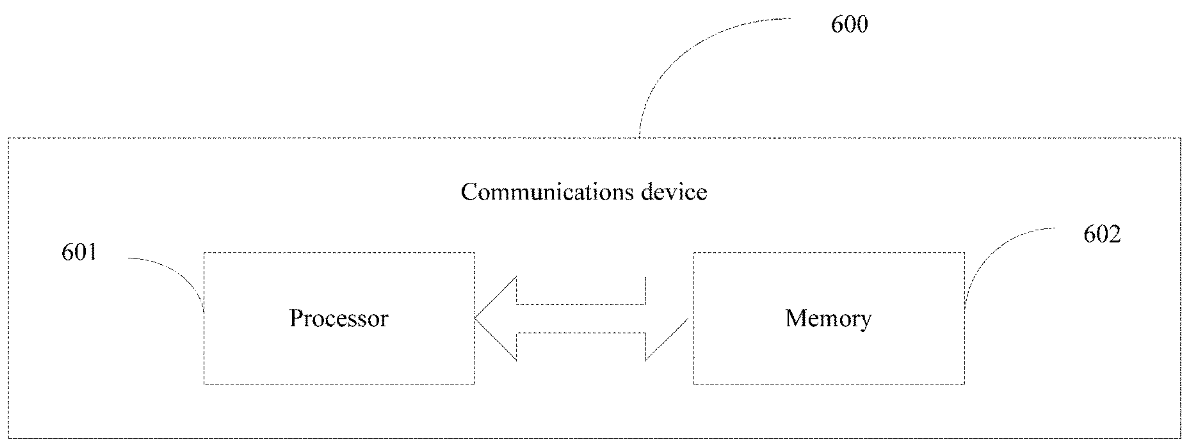
FIG. 6 is a schematic structural diagram of a communications device according to an embodiment of this application.

Optionally, as shown in FIG. 6, an embodiment of this application further provides a communications device 600, including a processor 601, a memory 602, and a program or an instruction that is stored in the memory 602 and that can be run on the processor 601. For example, when the communications device 600 is a terminal, the program or the instruction is executed by the processor 601 to implement the processes of the foregoing working state switching method embodiment, and a same technical effect can be achieved. When the communications device 600 is a network side device, the program or the instruction is executed by the processor 601 to implement the processes of the foregoing working state switching method embodiment, and a same technical effect can be achieved. To avoid repetition, details are not described herein again.

Figure 7:
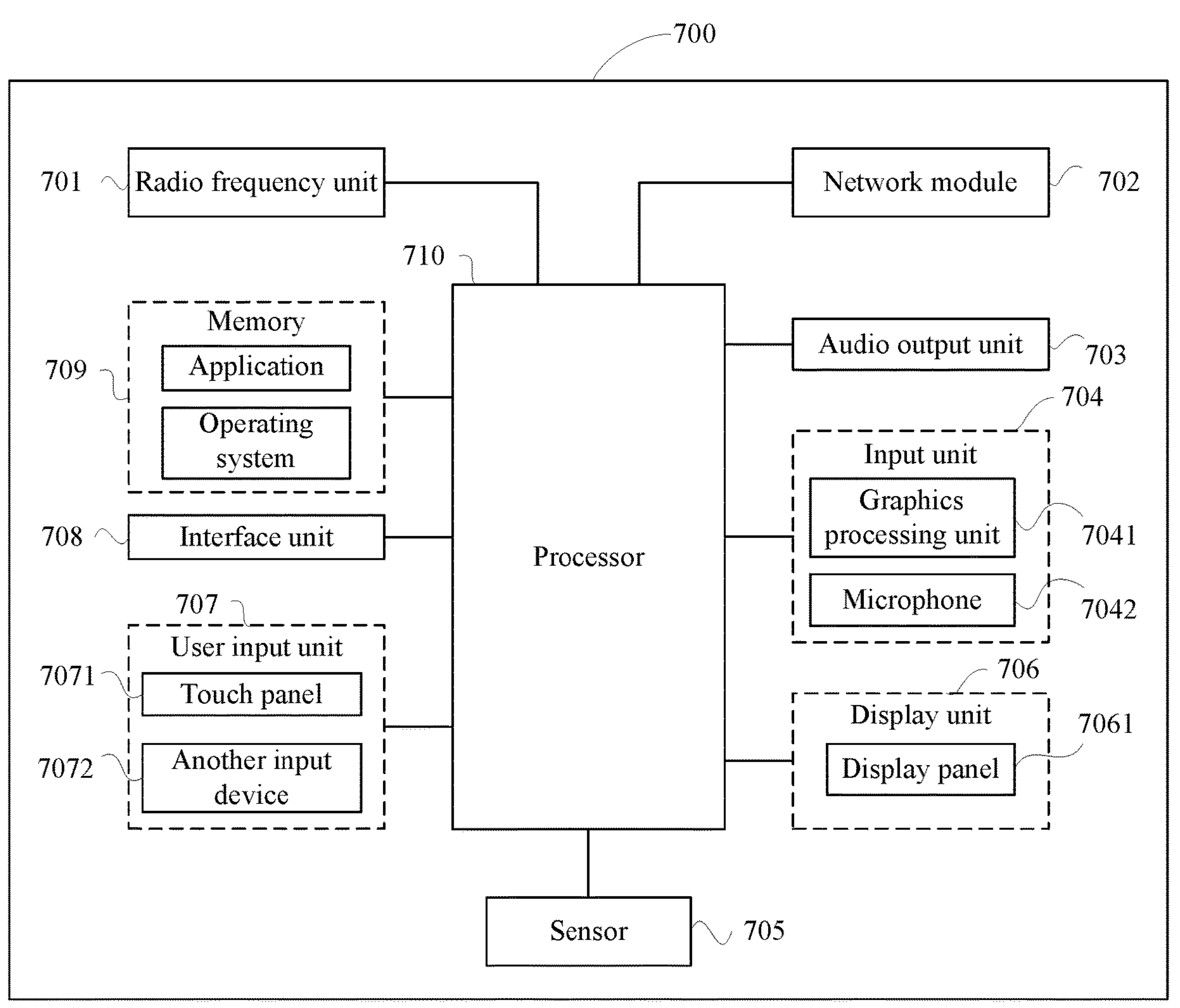
FIG. 7 is a schematic structural diagram of hardware of a terminal according to an embodiment of this application.

FIG. 7 is a schematic structural diagram of hardware of a terminal according to an embodiment of this application.

A terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (such as a battery) that supplies power to each component. The power supply may be logically connected to the processor 710 by using a power supply management system, to implement functions such as charging and discharging management, and power consumption management by using the power supply management system. The terminal structure shown in FIG. 7 constitutes no limitation on the terminal, and the terminal may include more or fewer components than those shown in the figure, or combine some components, or have different component arrangements. Details are not described herein.

It should be understood that, in this embodiment of this application, the input unit 704 may include a graphics processing unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. Optionally, the display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network side device and then sends the downlink data to the processor 710 for processing; and sends uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application or an instruction required by at least one function (for example, a sound playing function or an image playing function). In addition, the memory 709 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage component, a flash memory component, or another non-volatile solid-state storage component.

The processor 710 may include one or more processing units. Optionally, an application processor and a modem processor may be integrated into the processor 710. The application processor mainly processes an operating system, a user interface, an application, an instruction, or the like. The modem processor mainly processes wireless communications, for example, a baseband processor. It can be understood that, alternatively, the modem processor may not be integrated into the processor 710.

The processor 710 is configured to: when a trigger condition is met, switch from a first working state to a second working state, where the first working state means that the terminal is in a first state on a first downlink, and the second working state means that the terminal is in a second state on a second downlink;

the first downlink or the second downlink includes at least one of the following: a downlink A, a downlink B, and a downlink C, where the downlink A is a link on which a network side device sends information to the terminal, the downlink B is a link on which a large intelligent surface LIS or a relay device sends information to the terminal by changing a signal feature of the downlink A, and the downlink C is a link on which the LIS or the relay device directly sends information to the terminal; and the trigger condition includes at least one of the following: target signaling is received, where the target signaling instructs the terminal to switch from the first working state to the second working state; and a target timer in the first working state expires.

In this embodiment of this application, in a case that a trigger condition is met, an apparatus may switch from a first working state to a second working state, where a downlink in the first working state and the second working state may be a link on which a network side device sends information to a terminal, or a link on which a large intelligent surface LIS or a relay device sends information to the terminal by changing a signal feature of a downlink A, or a link on which the LIS or the relay device directly sends information to the terminal. That is, according to this application, in a system including an LIS and a base station, the terminal can work on different downlink logical links and switch between different downlink logical links according to a requirement, thereby balancing transmission efficiency and power saving of the terminal.

An embodiment of this application further provides a readable storage medium. The readable storage medium stores a program or an instruction, and when the program or the instruction is executed by a processor, the processes of the foregoing working state switching method embodiment are implemented and a same technical effect can be achieved. To avoid repetition, details are not described herein again.

The processor is a processor in the terminal in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction of a network side device to implement the processes of the foregoing working state switching method embodiment and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms “include”, “comprise”, or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by “including a . . . ” does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A working state switching method, comprising:

when a trigger condition is met, switching, by a terminal, from a first working state to a second working state; and executing, by the terminal, a receiving behavior in the second working state, wherein the first working state means that the terminal is in a first state on a downlink A, and the second working state means that the terminal is in a second state on a downlink B or a downlink C; or, the first working state means that the terminal is in the first state on either the downlink B or the downlink C, and the second working state means that the terminal is in the second state on the downlink A, or on the other one of the downlink B and the downlink C, and the second working state is different from the first working state;

each of the first state and the second state comprises at least one of: an idle state, an inactive state, and a connected state;

wherein the downlink A is a link on which a network side device sends information to the terminal;

the downlink B is a link on which a large intelligent surface (LIS) or a relay device sends information to the terminal by changing a signal feature of the downlink A, wherein the LIS is a passive LIS or an active LIS, and the relay device is a passive relay device or an active relay device;

the downlink C is a link on which the LIS or the relay device directly sends information to the terminal, wherein the LIS is the active LIS, and the relay device is the activate device; and the trigger condition comprises at least one of the following: target signaling is received; and a target timer in the first working state expires.

2. The method according to claim 1, wherein when the first working state is that the terminal is in the idle state or the inactive state on the downlink A, the switching, by a terminal, from working in the first working state to working in the second working state comprises:

monitoring, by the terminal, first signaling on the downlink A; and switching, by the terminal, from working in the first working state to working in the second working state according to the first signaling, wherein the second working state is that the terminal is in the connected state on the downlink B;

wherein configuration information of the second working state is notified by using a system message or the first signaling, wherein the system message is a system message in the first working state.

3. The method according to claim 1, wherein when the first working state is that the terminal is in the connected state on the downlink B, the switching, by a terminal, from working in the first working state to working in the second working state comprises:

monitoring, by the terminal, second signaling on the downlink B; and switching, by the terminal, from working in the first working state to working in the second working state according to the second signaling, wherein the second working state is that the terminal is in the idle state or the inactive state on the downlink A, or the second working state is that the terminal is in the connected state on the downlink A;

wherein data transmission in the first working state is implemented by changing a phase, an amplitude, or a frequency of a dedicated signal on the downlink A or by changing a phase, an amplitude, or a frequency of a non-dedicated signal on the downlink A.

4. The method according to claim 1, wherein when the first working state is that the terminal is in the connected state on the downlink B, the switching, by a terminal, from working in the first working state to working in the second working state comprises:

when a first timer in the first working state expires, switching, by the terminal, from working in the first working state to working in the second working state, wherein the second working state is that the terminal is in the idle state or the inactive state on the downlink A, or the second working state is that the terminal is in the connected state on the downlink A.

5. The method according to claim 1, wherein when the first working state is that the terminal is in the connected state on the downlink A, the switching, by a terminal, from working in the first working state to working in the second working state comprises:

monitoring, by the terminal, third signaling on the downlink A; and switching, by the terminal, from working in the first working state to working in the second working state according to the third signaling, wherein the second working state is that the terminal is in the connected state on the downlink B.

6. The method according to claim 1, wherein when the first working state is that the terminal is in the connected state on the downlink A, the switching, by a terminal, from working in the first working state to working in the second working state comprises:

when a second timer in the first working state expires, switching, by the terminal, from working in the first working state to working in the second working state, wherein the second working state is that the terminal is in the connected state on the downlink B.

7. The method according to claim 1, wherein when the LIS is the passive LIS, and the relay device is the passive relay device, and the method further comprises:

sending, by the terminal, information by using at least one of the following uplinks:

a link on which the terminal indirectly sends information to the LIS or the relay device, wherein the network side device receives the information sent by the terminal and forwards the information to the LIS or the relay device; and a link on which the terminal directly sends information to the network side device.

8. The method according to claim 1, wherein when the first working state is that the terminal is in the idle state or the inactive state on the downlink A, the switching, by a terminal, from working in the first working state to working in the second working state comprises:

monitoring, by the terminal, fourth signaling on the downlink A; and switching, by the terminal, from working in the first working state to working in the second working state according to the fourth signaling, wherein the second working state is that the terminal is in the connected state on the downlink C;

wherein configuration information of the second working state is notified by using a system message or first signaling, wherein the system message is a system message in the first working state.

9. The method according to claim 8, further comprising:

sending, by the terminal, information by using at least one of the following uplinks:

a link on which the terminal directly sends information to the LIS or the relay device, wherein the LIS or the relay device comprises an active receiving module or an active transceiver module;

a link on which the terminal indirectly sends information to the LIS or the relay device, wherein the network side device receives the information sent by the terminal and forwards the information to the LIS or the relay device;

a link on which the terminal directly sends information to the network side device; and a link on which the terminal indirectly sends information to the network side device, wherein the LIS or the relay device receives the information sent by the terminal and forwards the information to the network side device.

10. The method according to claim 1, wherein when the first working state is that the terminal is in the connected state on the downlink C, the switching, by a terminal, from working in the first working state to working in the second working state comprises:

monitoring, by the terminal, fifth signaling on the downlink A; and switching, by the terminal, from working in the first working state to working in the second working state according to the fifth signaling, wherein the second working state is that the terminal is in the idle state or the inactive state on the downlink A, or the second working state is that the terminal is in the connected state on the downlink A;

wherein when the first working state is that the terminal is in the connected state on the downlink C, the switching, by a terminal, from working in the first working state to working in the second working state comprises:

when a third timer in the first working state expires, switching, by the terminal, from working in the first working state to working in the second working state, wherein the second working state is that the terminal is in the idle state or the inactive state on the downlink A, or the second working state is that the terminal is in the connected state on the downlink A.

11. The method according to claim 1, wherein when the first working state is that the terminal is in the connected state on the downlink A, the switching, by a terminal, from working in the first working state to working in the second working state comprises:

monitoring, by the terminal, sixth signaling on the downlink A; and switching, by the terminal, from working in the first working state to working in the second working state according to the sixth signaling, the second working state is that the terminal is in the connected state on the downlink C; and the method further comprises:

when a fourth timer in the first working state expires, switching, by the terminal, from working in the first working state to working in the second working state.

12. The method according to claim 1, wherein when the first working state is that the terminal is in the idle state or the inactive state on the downlink A, the switching, by a terminal, from working in the first working state to working in the second working state comprises:

monitoring, by the terminal, seventh signaling on the downlink A; and switching, by the terminal, from working in the first working state to working in the second working state according to the seventh signaling, wherein the second working state is that the terminal enters a target downlink and is in the connected state, and the target downlink is at least one of the following links: the downlink B, and the downlink C;

wherein when the first working state is that the terminal is in the idle state or the inactive state on the downlink A, the switching, by a terminal, from working in the first working state to working in the second working state comprises:

when a fifth timer in the first working state expires, switching, by the terminal, from working in the first working state to working in the second working state, wherein the second working state is that the terminal enters the target downlink and is in the connected state, and the target downlink is at least one of the following links: the downlink B, and the downlink C.

13. The method according to claim 1, wherein when the first working state is that the terminal is in the idle state or the inactive state on the downlink C, the switching, by a terminal, from working in the first working state to working in the second working state comprises:

monitoring, by the terminal, eighth signaling on the downlink A; and switching, by the terminal, from working in the first working state to working in the second working state according to the eighth signaling, wherein the second working state is that the terminal enters a target downlink and is in the connected state.

14. The method according to claim 13, wherein the terminal sends information by using at least one of the following uplinks:

a link on which the terminal directly sends information to the LIS or the relay device, wherein the LIS or the relay device comprises an active receiving module or an active transceiver module;

a link on which the terminal indirectly sends information to the LIS or the relay device, wherein the network side device receives the information sent by the terminal and forwards the information to the LIS or the relay device;

a link on which the terminal directly sends information to the network side device; and a link on which the terminal indirectly sends information to the network side device, wherein the LIS or the relay device receives the information sent by the terminal and forwards the information to the network side device.

15. The method according to claim 1, wherein when the first working state is that the terminal enters a target downlink and is in the connected state, the switching, by a terminal, from working in the first working state to working in the second working state comprises:

monitoring, by the terminal, ninth signaling on the target link; and switching, by the terminal, from working in the first working state to working in the second working state according to the ninth signaling, wherein the second working state is that the terminal is in the idle state or the inactive state on the downlink C, or the second working state is that the terminal is in the idle state or the inactive state on the downlink A or the downlink C; and the method further comprises:

when a sixth timer in the first working state expires, switching, by the terminal, from working in the first working state to working in the second working state, wherein the second working state is that the terminal is in the idle state or the inactive state on the downlink C, or the second working state is that the terminal is in the idle state or the inactive state on the downlink A or the downlink C.

16. The method according to claim 1, further comprising:

in a case of switching from the first working state to the second working state, determining, by the terminal, target information in the second working state according to target information in the first working state and a first mapping table, wherein the target information comprises at least one of the following: beam information, a synchronization signal block (SSB), a channel state information reference signal (CSI-RS), and quasi co-location (QCL) information; and the first mapping table is used to indicate a mapping relationship between the target information in the first working state and the target information in the second working state.

17. The method according to claim 1, further comprising:

determining, by the terminal, target information of the second uplink according to target information of the first uplink and a second mapping table, and switching from the first uplink to the second uplink, wherein the target information comprises at least one of the following: beam information and QCL information;

the first uplink or the second uplink comprises at least one of the following:

a link on which the terminal directly sends information to the LIS or the relay device, wherein the LIS or the relay device comprises an active receiving module or an active transceiver module;

a link on which the terminal indirectly sends information to the LIS or the relay device, wherein the network side device receives the information sent by the terminal and forwards the information to the LIS or the relay device;

a link on which the terminal directly sends information to the network side device; and a link on which the terminal indirectly sends information to the network side device, wherein the LIS or the relay device receives the information sent by the terminal and forwards the information to the network side device; and the second mapping table is used to indicate a mapping relationship between target information in the first working state and target information in the second working state.

18. A terminal, comprising a processor, a memory, and an instruction that is stored in the memory and that can be run on the processor, wherein the instruction, when being executed by the processor, causes the processor to perform:

when a trigger condition is met, switching, by a terminal, from a first working state to a second working state; and executing, by the terminal, a receiving behavior in the second working state, wherein the first working state means that the terminal is in a first state on a downlink A, and the second working state means that the terminal is in a second state on a downlink B or a downlink C; or, the first working state means that the terminal is in the first state on either the downlink B or the downlink C, and the second working state means that the terminal is in the second state on the downlink A, or on the other one of the downlink B and the downlink C, and the second working state is different from the first working state;

each of the first state and the second state comprises at least one of: an idle state, an inactive state, and a connected state;

wherein the downlink A is a link on which a network side device sends information to the terminal;

the downlink B is a link on which a large intelligent surface (LIS) or a relay device sends information to the terminal by changing a signal feature of the downlink A, wherein the LIS is a passive LIS or an active LIS, and the relay device is a passive relay device or an active relay device;

the downlink C is a link on which the LIS or the relay device directly sends information to the terminal, wherein the LIS is the active LIS, and the relay device is the activate device; and the trigger condition comprises at least one of the following: target signaling is received; and a target timer in the first working state expires.

19. A non-transitory readable storage medium, wherein the non-transitory readable storage medium stores an instruction, and the instruction, when being executed by a processor, causes the processor to perform: when a trigger condition is met, switching, by a terminal, from a first working state to a second working state; and executing, by the terminal, a receiving behavior in the second working state, wherein the first working state means that the terminal is in a first state on a downlink A, and the second working state means that the terminal is in a second state on a downlink B or a downlink C; or, the first working state means that the terminal is in the first state on either the downlink B or the downlink C, and the second working state means that the terminal is in the second state on the downlink A, or on the other one of the downlink B and the downlink C, and the second working state is different from the first working state; each of the first state and the second state comprises at least one of: an idle state, an inactive state, and a connected state; wherein the downlink A is a link on which a network side device sends information to the terminal; the downlink B is a link on which a large intelligent surface (LIS) or a relay device sends information to the terminal by changing a signal feature of the downlink A, wherein the LIS is a passive LIS or an active LIS, and the relay device is a passive relay device or an active relay device; the downlink C is a link on which the LIS or the relay device directly sends information to the terminal, wherein the LIS is the active LIS, and the relay device is the activate device; and the trigger condition comprises at least one of the following: target signaling is received; and a target timer in the first working state expires.

* * * * *